Aug. 4, 1925.
C. C. SPREEN
1,548,221
AUTOMATIC OILING DEVICE
Filed June 5, 1923
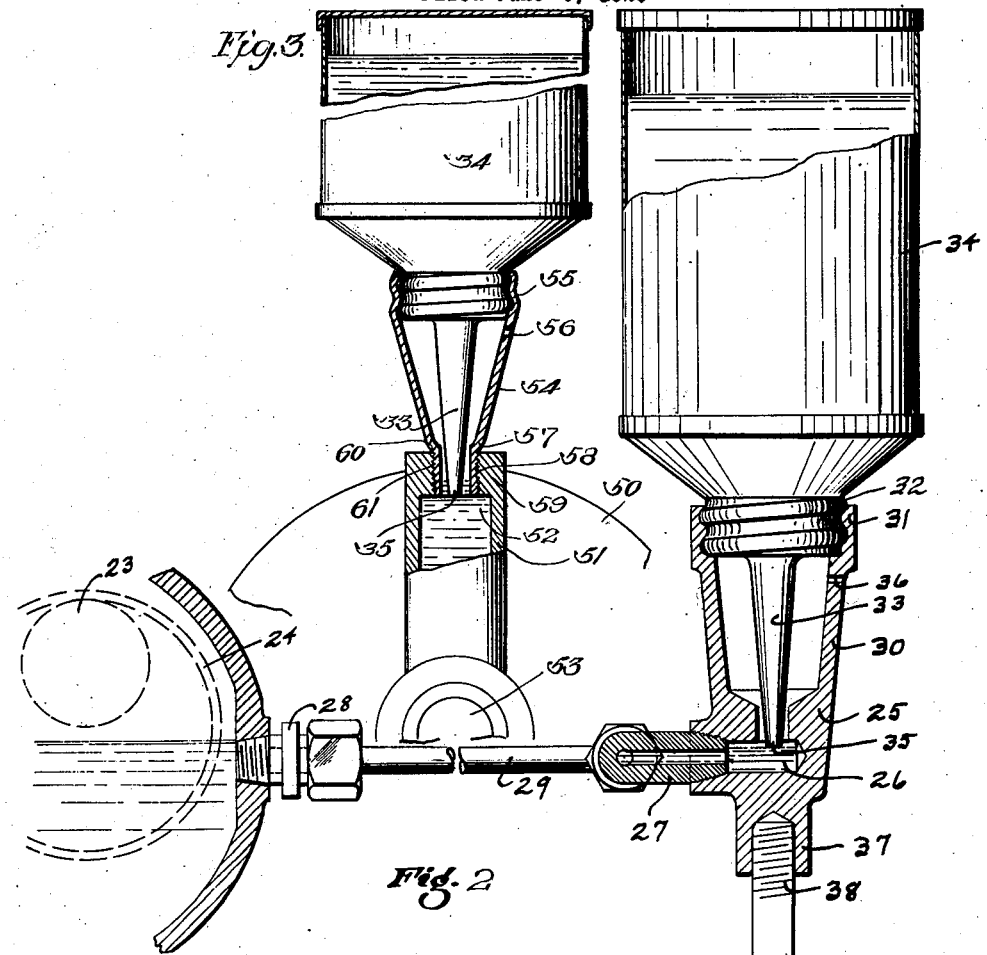
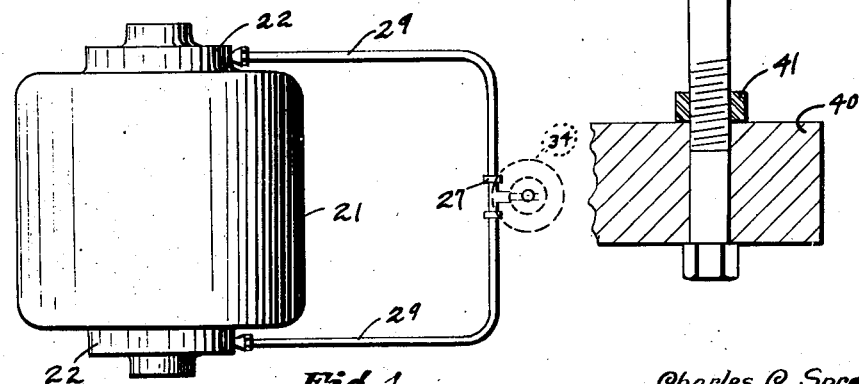
Charles C. Spreen
INVENTOR
By Smith and Freeman
ATTORNEYS Patented Aug. 4, 1925.

1,548,221

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

AUTOMATIC OILING DEVICE.

Application filed June 5, 1923. Serial No. 643,518.

*To all whom it may concern:*

Be it known that I, CHARLES C. SPREEN, a citizen of the United States, residing at Detroit, in the county of Wayne and State of Michigan, have invented a certain new and useful Improvement in Automatic Oiling Devices, of which the following is a full, clear, and exact description, reference being had to the accompanying drawings.

Recent years have witnessed the introduction and widespread use of mechanical power in establishments not provided with attendants skilled in the operation and maintenance of the power devices. It is obvious that under these conditions it is essential that these power devices require the minimum attention both for operation and maintenance. Heretofore various modifications have been made to partially accomplish this object but so far as I am aware at the present time there has been suggested no satisfactory method of supplying oil to the machinery over a long period of time. My invention provides means to accomplish this result. In the drawings accompanying this specification and forming a part thereof I have shown, for purposes of illustration, certain physical embodiments which my inventive concept may assume and, because the electric motor is probably the power device most frequently encountered in establishments of the type herein considered, I have shown these illustrative embodiments as applied to an electric motor. In these drawings:

Figure 1 is a plan view showing one embodiment of my invention suitable for application to a power device of the type employing an oil well, Figure 2 is a partial section enlarged to show the detail construction, Figure 3 shows one form of my invention adapted for use with a power device employing a packed oil receptacle.

The installation disclosed in Figures 1 and 2 is particularly designed for use with a power device, such as the motor 21, provided with an oil well 22 from which the oil is conveyed to the top of the shaft 23 by one or more oil rings 24. The particular installation herein disclosed comprises a fitting 25 provided with an aperture 26 adapted to receive the opening of a container containing a relatively large supply of oil and connected to the oil wells 22 by means of a system of piping comprising a T 27 tapped into the fitting 25 in communication with the receptacle 26, a pair of unions 28 tapped into the oil wells 22, and a pair of ducts 29 connecting the unions 28 with the T 27. This fitting 25 also comprises means for supporting the container and in the instant case this means is shown as consisting of a column 30 formed at its upper end 31 to receive the base 32 of the spout 33 of an ordinary oil can 34 and to hold the can in such position that the tip 35 of the spout 33 terminates within the receptacle 26. Below its upper end 31 the column 30 is provided with an aperture 36 opening to the atmosphere. The entire fitting 25 may be supported in any suitable manner such as that herein shown wherein the fitting 25 is screw-threaded at its lower end to receive the upper end of a bolt 39 which is shown as passing through the base 40 and clamped in position by means of a clamping nut 41.

It will be understood from the above description that oil will flow from the container 34 into the receptacle 26 and through the T 27, ducts 29, and unions 28 into the oil wells 22 until the level of the oil in the receptacle 26 rises to the tip 35 of the spout 33 and by thus sealing the spout prevent air from entering the container 34 through the spout. Inasmuch as the spout 33 constitutes the only functioning opening into the container 34 sealing of this opening completely prevents all entrance of air into the container 34 and thus completely prevents the further flow of oil from the container until the level of the oil descends below the tip 35 of the spout 33 and permits further air to the container 34 through the aperture 36, column 30, receptacle 26, and spout 33 to permit oil to flow from the container 34 until the level of the oil within the oil wells 22 and receptacle 26 is raised to again seal the tip 35 of the spout 33.

The installation disclosed in Figure 3 is particularly designed for use with a power device, such as the motor 50, provided with an oil cup 51 usually filled with packing 52 and in direct communication with the shaft 53 so that the oil may flow by gravity from the oil cup 51 into the bearing. The particular installation herein shown comprises a fitting 54 generally tubular in form, formed at its upper end 55 to support the usual oil can 34 in position with the tip 35 of its spout 33 extending within the oil cup 51, provided intermediate its ends with the aperture 56 opening to atmosphere, and reduced at its lower end 57 to enter within the aperture 58 in the upper end 59 of the oil cup 51 and support the fitting 54 from the oil cup 51 by means of cooperating screw-threads 60 and 61 carried respectively by the outer surface of the reduced lower end 57 of the fitting 54 and the inner surface of the aperture 58 of the oil cup 51.

It will be understood that the operation of the installation disclosed in Figure 3 is in general similar to that of the installation disclosed in Figures 1 and 2 and that accordingly air will flow through the aperture 56, fitting 54, and spout 33 into the container 34 to permit oil to flow from the container 34 into the oil cup 51 and it will be understood that this action will continue until the level of the oil in the oil cup 51 reaches and seals the tip 35 of the spout 33 whereupon the action will be interrupted until the level of the oil within the oil cup 51 descends below and opens the tip 35 of the spout 33 whereupon the action will recur until the oil level within the cup 51 again reaches and seals the tip 35 of the spout 33.

It will be apparent to those skilled in the art that I have provided a simple and satisfactory method of supplying a large quantity of oil to devices of the type herein considered and particularly to an electric motor of the type using an oil well or an electric motor of the type using an oil cup. It will also be apparent to those skilled in the art that the installations herein illustrated may be variously modified without sacrificing the advantages or departing from the spirit of my inventive concept and that the disclosure herein is therefore illustrative only and my invention not limited thereto but on the contrary comprehending any installation arranged to accomplish the objects of my invention by equivalent instrumentalities.

I claim:

1. An oiling device comprising an oil receptacle provided with a discharge passageway; a fitting provided with an inlet passageway, supporting said receptacle with said outlet passageway disposed within said inlet passageway and with the opening of said inlet passageway disposed above the level of the opening of said outlet passageway, provided with an opening to the exterior disposed above said level, and provided with an outlet opening disposed below said level; and a stem secured to said fitting and arranged to be secured to a base member to support said fitting from said base member.

2. An oiling device comprising an oil can of the type having a body and a spout screw-threadedly connected and having the screw threads of the exterior one of said body or spout present on the exterior surface of said exterior one; and a fitting provided with an inlet passageway screw-threaded interiorly and cooperatively receiving said exteriorly present screw threads of said exterior one to thus support said oil can from said fitting, provided with an opening to the exterior disposed above the discharge opening of said oil can, and provided with an outlet opening below said level.

In testimony whereof, I hereunto affix my signature.

CHARLES C. SPREEN.